US012762859B2

(12) United States Patent
Yuan

(10) Patent No.: US 12,762,859 B2
(45) Date of Patent: Oct. 13, 2026

(54) ELECTRONIC DEVICE AND VIDEO CLIP EXTRACTION METHOD THEREOF

(71) Applicant: Acer Incorporated, New Taipei City (TW)

(72) Inventor: Chia-Shang Yuan, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 105 days.

(21) Appl. No.: 18/518,472

(22) Filed: Nov. 23, 2023

(65) Prior Publication Data

US 2025/0118071 A1 Apr. 10, 2025

(30) Foreign Application Priority Data

Oct. 5, 2023 (TW) ................................. 112138321

(51) Int. Cl.
*G06V 20/40* (2022.01)

(52) U.S. Cl.
CPC .............. *G06V 20/41* (2022.01); *G06V 20/44* (2022.01)

(58) Field of Classification Search
None
See application file for complete search history.

(56) References Cited

U.S. PATENT DOCUMENTS

2017/0201793 A1* 7/2017 Pereira ............... H04N 21/8352
2017/0228600 A1* 8/2017 Syed ...................... G06V 20/62
2018/0084310 A1* 3/2018 Katz ...................... G06N 3/045
2021/0236944 A1* 8/2021 Summa ............ H04N 21/44008
2021/0252394 A1* 8/2021 Hwang ................. A63F 13/332
2022/0108727 A1* 4/2022 van Welzen ......... G11B 27/031
2022/0188550 A1* 6/2022 Cheng ..................... G06N 3/045
2022/0308696 A1* 9/2022 Lee ....................... G06F 3/0441
2022/0410004 A1* 12/2022 van Welzen ............ A63F 13/49
2022/0414487 A1* 12/2022 Si .......................... G06N 20/00
2023/0045617 A1* 2/2023 Narasimma Moorthy ................. G06F 9/44521
2023/0071358 A1* 3/2023 van Welzen ........... G06V 20/46
2023/0079785 A1* 3/2023 Xi .......................... A63F 13/52 386/278
2023/0201717 A1* 6/2023 Liang ...................... G10L 15/26 463/31
2023/0267737 A1* 8/2023 Green .................... G06V 20/42 382/103
(Continued)

FOREIGN PATENT DOCUMENTS

CN 114329065 4/2022

OTHER PUBLICATIONS

Yoon Kim, "Convolutional Neural Networks for Sentence Classification", Sep. 3, 2014, retrieved from arXiv database, arXiv:1408.5882v2 [cs.CL] 3, pp. 1-6.

*Primary Examiner* — Daniel T Tekle
(74) *Attorney, Agent, or Firm* — JCIPRNET

(57) ABSTRACT

An electronic device and a video clip extraction method thereof are disclosed. The method includes the following steps. Event information of multiple game events of a game application during a program execution period is obtained. The event information of the game events is converted into an input text. The input text is provided to a text classification model. A video clip is extracted from a recorded game video of the game application according to a classification category of the input text predicted by the text classification model.

12 Claims, 6 Drawing Sheets

(56) References Cited

U.S. PATENT DOCUMENTS

| | | | | |
|---|---|---|---|---|
| 2024/0177486 | A1* | 5/2024 | Jin | G06V 20/46 |
| 2025/0118071 | A1* | 4/2025 | Yuan | G06V 20/41 |

* cited by examiner

ELECTRONIC DEVICE AND VIDEO CLIP EXTRACTION METHOD THEREOF

CROSS-REFERENCE TO RELATED APPLICATION

This application claims the priority benefit of Taiwan application serial no. 112138321, filed on Oct. 5, 2023. The entirety of the above-mentioned patent application is hereby incorporated by reference herein and made a part of this specification.

BACKGROUND

Technical Field

This disclosure relates to an electronic device, and in particular to an electronic device and a video clip extraction method thereof.

Description of Related Art

With the advancement of technology, powerful performance and rich applications have made electronic devices an indispensable necessity in the daily life of modern people. For example, playing games with electronic devices has become a very popular pastime. When a gamer plays a game through a digital device, he or she may want to record the highlight clips or important moments in the game. Currently, users can record their gameplay by means of screen recording, so that they can play back the recorded game video to re-live the thrill of the gameplay or recall the highlight clips.

However, users usually need to manually edit the recorded game videos to extract the highlight clips from the long gameplay videos, which is not only time-consuming and labor-intensive, but also does not allow users to get the highlight clips in real time while the game is still in progress.

SUMMARY

The disclosure proposes an electronic device and a video clip extraction method thereof, capable of solving the above technical problems.

The disclosure provides a video clip extraction method including the following. Event information of multiple game events of a game application is obtained during a program execution period. The event information of the game events is converted into an input text. The input text is provided to a text classification model. A video clip is extracted from a recorded game video of the game application according to a classification category of the input text predicted by the text classification model.

The disclosure further provides an electronic device including a storage device and a processor. The storage device records multiple modules, and the processor is coupled to the storage device and executes the module to: obtain event information of multiple game events of a game application during a program execution period; convert the event information of the game events into an input text; provide the input text to a text classification model; extract a video clip from a recorded game video of the game application according to a classification category of the input text predicted by the text classification model.

Based on the above, in the embodiment of the disclosure, after the event information of multiple game events is obtained, the event information may be converted into an input text. By inputting the input text into a trained text classification model, the text classification model outputs the classification category of the input text. Thus, according to a classification result of the input text, highlights or key video clips with specific content may be extracted from the recorded game video.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
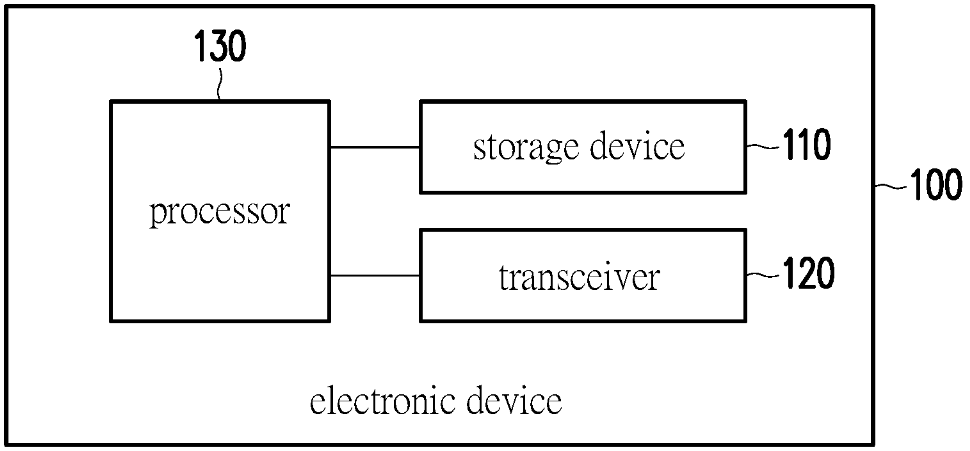
FIG. 1 is a schematic diagram of an electronic device according to an embodiment of the disclosure.

Reference will now be made in detail to the exemplary embodiments of the disclosure, examples of which are illustrated in the accompanying drawings. Whenever possible, the same reference numerals are used in the drawings and descriptions to represent the same or similar parts. These embodiments are only part of the disclosure and do not disclose all possible implementations of the disclosure. Rather, these embodiments are merely examples of device and method within the scope of the claims of the disclosure.

Referring to FIG. 1, an electronic device 100 in this embodiment is, for example, an electronic device with computing capabilities such as a laptop computer, a desktop computer, or a server, and the disclosure is not limited thereto. It should be noted that in different embodiments, the electronic device 100 can be a server, a server cluster composed of multiple servers, or other distributed systems, which is not limited in the disclosure. The electronic device 100 includes a storage device 110, a transceiver 120, and a processor 130. The processor 130 is coupled to the transceiver 120 and the storage device 110, and functions thereof are described as follows.

The storage device 110 is used to store files, images, instructions, program codes, software modules and other data. It can be, for example, any type of fixed or removable random access memory (RAM), read-only memory (ROM), flash memory, hard disk, or other similar device, integrated circuit, or combination thereof.

The transceiver 120 may transmit and receive signals wirelessly or wired. The transceiver 120 may also perform operations such as low noise amplification, impedance matching, frequency mixing, up or down frequency conversion, filtering, amplification, and the like. The electronic device 100 may receive and send data through the transceiver 120.

The processor 130 is, for example, a central processing unit (CPU), an application processor (AP), or other programmable general-purpose or special-purpose microprocessor, digital signal processor (DSP), programmable controller, application specific integrated circuits (ASIC), programmable logic device (PLD), graphics processing unit (GPU), or other similar devices or a combination of these devices. The processor 130 may execute program codes, software modules, instructions, etc. recorded in the storage device 110 to implement the video clip extraction method in this embodiment. The software modules may be broadly interpreted to mean instructions, instruction sets, codes, program codes, programs, applications, software packages, threads, programs, functions, etc.

In the embodiment of the disclosure, the electronic device 100 may identify important content in a recorded game video according to event information of a game event of a game application (also known as an in-game event), and extract video clip with important content according to time information of the important content on a game timeline.

Figure 2:
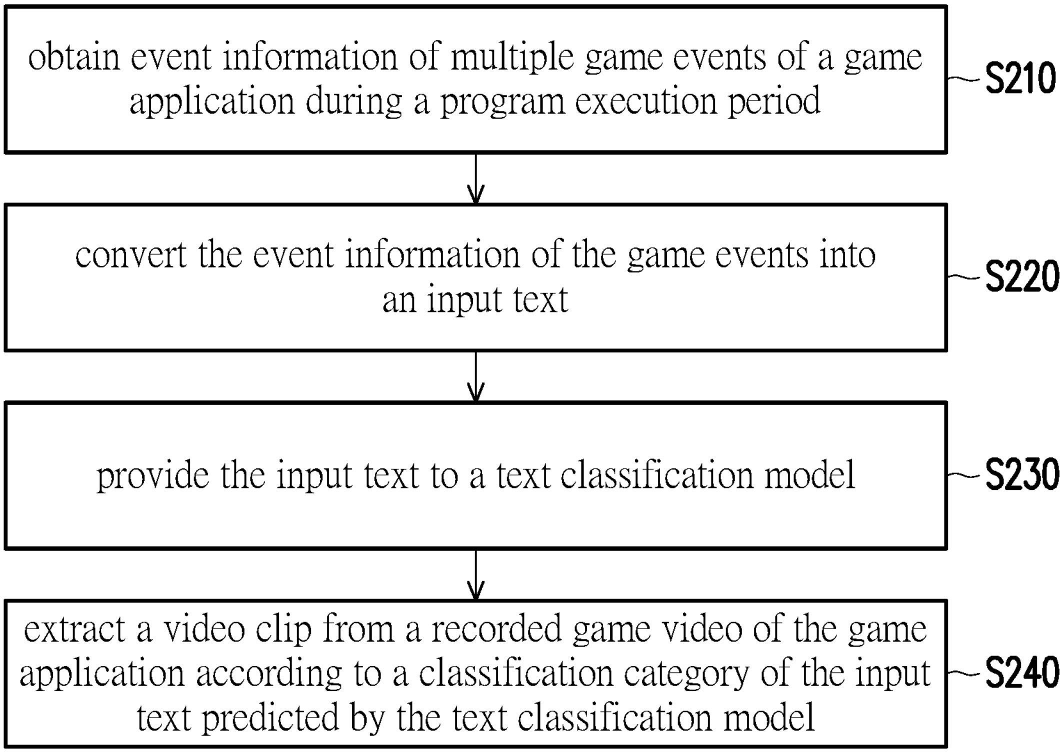
FIG. 2 is a flow chart of a video clip extraction method according to an embodiment of the disclosure.

Referring to FIG. 1 and FIG. 2, the method of this embodiment is adapted to the electronic device 100 in the above embodiment. Detailed steps of the video clip extraction method of this embodiment are described below with reference to various components in the electronic device 100.

In step S210, the processor 130 obtains event information of multiple game events of a game application during a program execution period. The game events may include in-game manipulation behavior of a user during game play. For example, the release of a game skill by a player during game play may be a game event, or the manipulation of game equipment by a player during game play may be a game event, and so on. For example, a game event may be a game start, game end, leveling, game win, kill streak, game stunt, or other type of game event. The event information may include event occurrence time and event identification of each of the game events. The event identification is, for example, an event name or an event identification code, etc. Event time information is the event occurrence time of the game event on the game timeline.

In some embodiments, the electronic device 100 may be a device that executes a game application. When the player operates the electronic device 100 to play a game, in response to an event notification including event information provided by the game application during execution, the processor 130 may record the event information of the game event on the storage device 110. The processor 130 may record the event information of the game event in the metadata of the recorded game video or other files. Alternatively, in other embodiments, the electronic device 100 can instantly receive event information of the game event from another device executing the game application.

Figure 3:
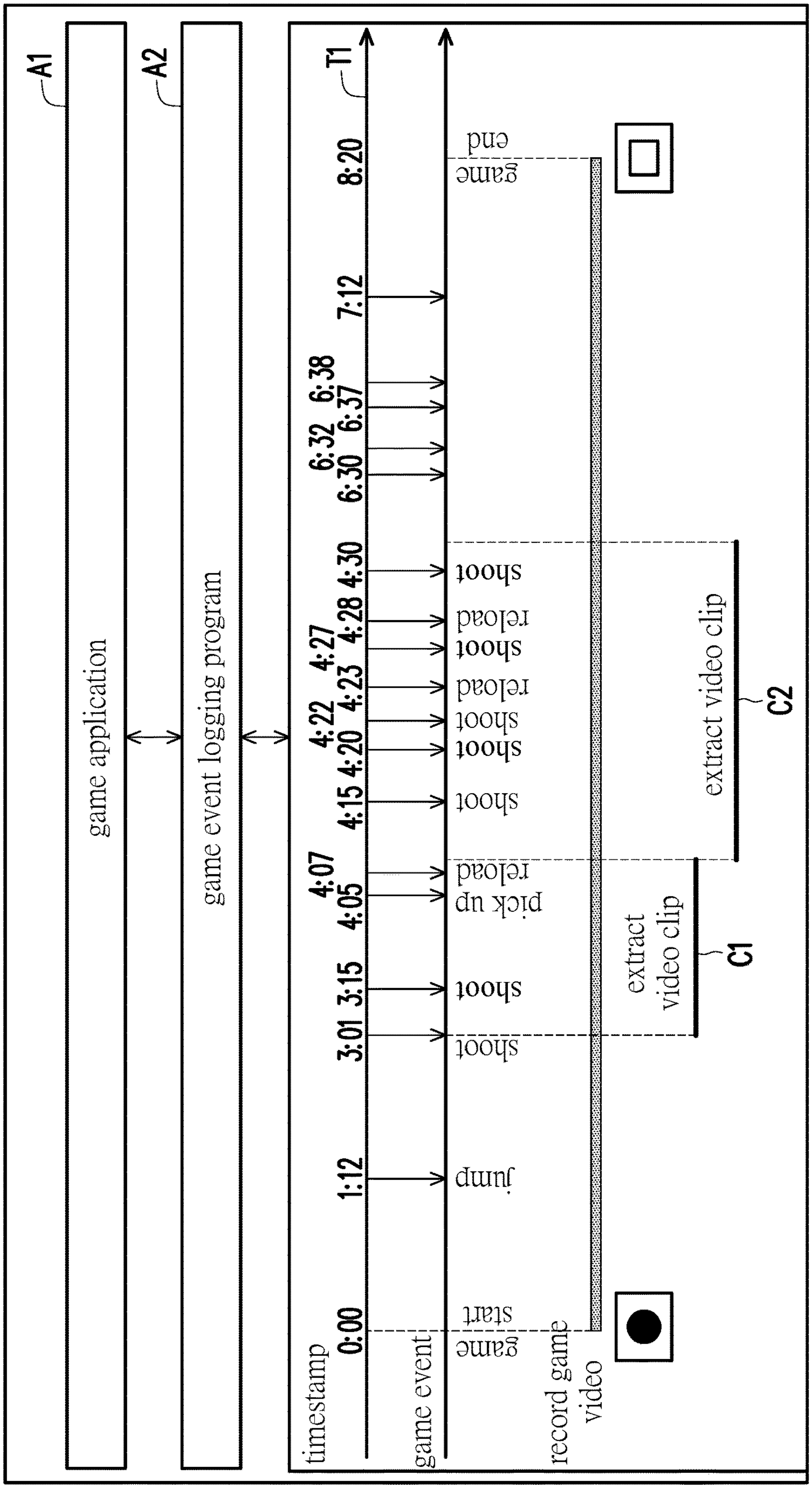
FIG. 3 is a schematic diagram of multiple game events according to an embodiment of the disclosure.

For example, FIG. 3 is a schematic diagram of multiple game events according to an embodiment of the disclosure. Referring to FIG. 3, during the execution of a game application A1, a game event logging program A2 may obtain the event information of multiple game events provided by the game application A1 and record the event information of the game events as an event log. In the example of FIG. 3, the processor 130 may obtain multiple game events of the game application A1 and the event occurrence time on a game timeline T1, such as the game event "jump" corresponding to the event occurrence time of "1 minute and 12 seconds", the game event "shoot" corresponding to the event occurrence time of "3 minutes and 01 seconds", and so on.

In addition, in some embodiments, by executing game recording software or other screen recording software, the processor 130 may activate a video recording function and start recording the game screen to obtain a recorded game video that records the game process. Alternatively, in other embodiments, the electronic device 100 may receive the recorded game video from another device executing the game application. Alternatively, in other embodiments, the electronic device 100 may receive the recorded game video from a game streaming server.

In step S220, the processor 130 converts the event information of the game events into an input text. Specifically, the processor 130 may utilize an event sampling time window to retrieve multiple game events for conversion into an input text. The event sampling time window may be used to mark a program execution period that include multiple game events. A length of the event sampling time window may be, for example, 30 seconds, one minute, two minutes, or other lengths of time. By sliding the event sampling time window on the game timeline according to a sampling interval, the processor 130 may capture multiple game events according to the location of the event sampling time window to generate the input text according to the event information of the sampled game events. The sampling interval is, for example, 10 seconds or other time grids. Assuming that the event sampling time window is 1 minute and the sampling interval is 10 seconds, the processor 130 will sample multiple game events within 1 minute every 10 seconds to generate the input text.

Figure 4:
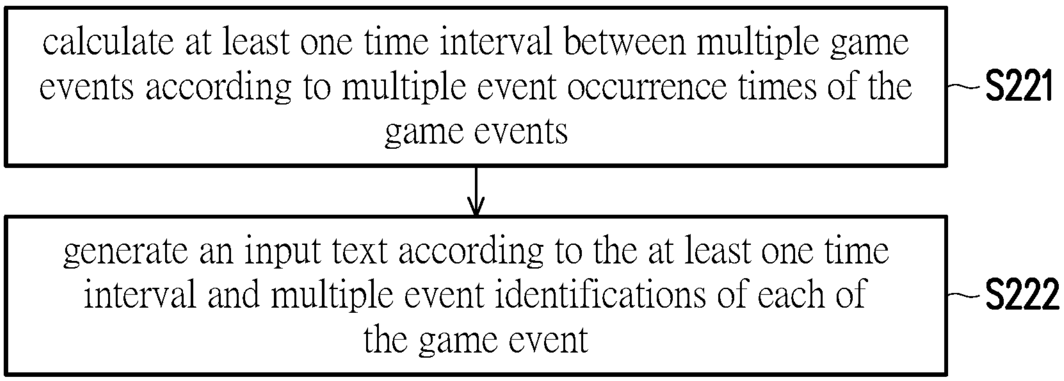
FIG. 4 is a flow chart of generating an input text according to an embodiment of the disclosure.

FIG. 4 is a flow chart of generating an input text according to an embodiment of the disclosure. Referring to FIG. 4, in some embodiments, step S220 may be implemented as step S221 to step S222.

In step S221, the processor 130 calculates at least one time interval between multiple game events according to multiple event occurrence times of the game events. In some embodiments, according to the event occurrence times of two adjacent game events on the game timeline, the processor 130 may calculate the time interval between the two adjacent game events. It can be seen that the time intervals may indicate the tightness of occurrence of the game events. Taking FIG. 3 as an example, the processor 130 may calculate that the time interval between the game event "shoot" corresponding to the event occurrence time "3 minutes and 01 seconds" and the game event "kill" corresponding to the event occurrence time "3 minutes and 15 seconds" is 14 seconds.

In step S222, the processor 130 generates the input text according to the at least one time interval and multiple event identifications of the each of the game events. Specifically, by concatenating the event identifications of the each of the game events and the at least one time interval, the processor 130 may obtain a corresponding input text. In other words, the input text is a text sequence generated by concatenating the at least one time interval and the event identifications of the each of the game events.

In some embodiments, the processor 130 arranges sequentially multiple event identifications and at least one time interval of multiple game events according to occurrence order of the game events, so as to generate an input text including the event identifications and the at least one time interval. In some embodiments, the at least one time interval and the event identifications may be staggered. For example, time intervals between a first game event and a second game event may be concatenated between an event identifier of the first game event and an event identifier of the second game event. Moreover, the order in which the event identifiers of the each of the game events are arranged in the input text may be determined according to the occurrence order of the game events on the game timeline.

In step S230, the processor 130 provides the input text to a text classification model. Model parameters of the text classification model trained based on training data may be recorded in the storage device 110. Specifically, text classification model may classify the input text into different categories or labels, which may include convolutional neural network models, random forest models, decision tree models, support vector machine models, or natural language models with semantic recognition capabilities, etc. For example, relevant details on the use of the text classification model may be found in the technical literature (e.g., "Yoon Kim at al., "Convolutional Neural Networks for Sentence Classification,", but it is not limited thereto).

Figure 5:
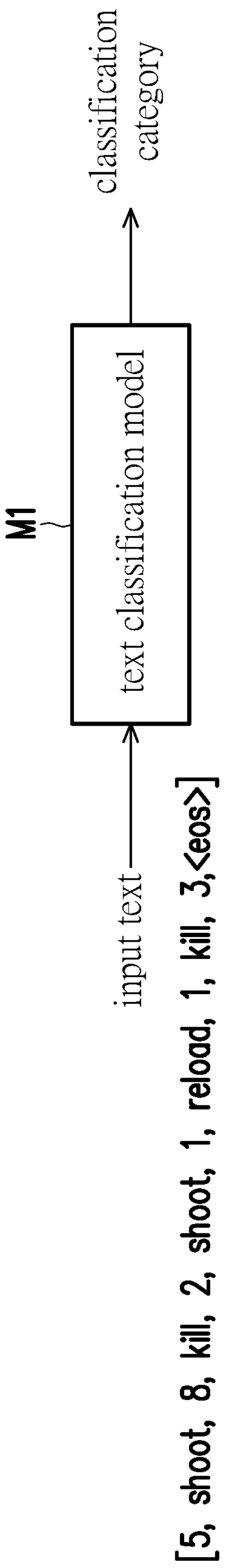
FIG. 5 is a schematic diagram of a text classification model according to an embodiment of the disclosure.

FIG. 5 is a schematic diagram of a text classification model according to an embodiment of the disclosure. Referring to FIG. 3 and FIG. 5, the processor 130 may generate input text [5, shoot, 8, kill, 2, shoot, 1, reload, 1, kill, 3] according to the event information of multiple game events, and input the input text [5, shoot, 8, kill, 2, shoot, 1, reload, 1, kill, 3] to a text classification model M1. The text classification model M1 classifies the input text [5, shoot, 8, kill, 2, shoot, 1, reload, 1, kill, 3] into one classification category among multiple default categories. The default categories are, for example, "like" and "dislike". Alternatively, in other embodiments, the default categories are, for example, "first game annotation" and "second game annotation". Alternatively, the default categories are, for example, "first game summary" and "second game summary".

More specifically, based on the event sampling time window, the processor 130 may sample a first sampling game event, a second sampling game event, a third sampling game event, a fourth sampling game event, and a fifth sampling game event. According to the first sampling game event "shoot" corresponding to the event occurrence time "4 minutes and 15 seconds" and the game event "reload" corresponding to the event occurrence time "4 minutes and 07 seconds". the processor 130 may obtain a time interval of 5 seconds. Next, according to the first sampling game event "shoot" corresponding to the event occurrence time "4 minutes and 15 seconds" and the second sampling game event "kill" corresponding to the event occurrence time "4 minutes and 20 seconds", the processor 130 may obtain a time interval of 8 seconds. Similarly, the processor 130 may obtain subsequent time intervals of 2 seconds, 1 second, 1 second, and 3 seconds, respectively.

Based on this, according to the first sampling game event "shoot" corresponding to the event occurrence time "4 minutes and 15 seconds", the second sampling game event "kill" corresponding to the event occurrence time "4 minutes and 20 seconds", and the third sampling game event "shoot" corresponding to the event occurrence time "4 minutes and 22 seconds", the fourth sampling game event "reload" corresponding to the event occurrence time "4 minutes and 23 seconds", and the fifth sampling game event "kill" corresponding to the event occurrence time "4 minutes and 27 seconds", the processor 130 may obtain the input text [5, shoot, 8, kill, 2, shoot, 1, reload, 1, kill, 3] in which the time interval and the event identifier are interleaved. The text classification model M1 may classify the input text [5, shoot, 8, kill, 2, shoot, 1, reload, 1, kill, 3] into one classification category among multiple default categories.

In step S240, the processor 130 extracts the video clip from the recorded game video of the game application according to a classification category of the input text predicted by the text classification model. In some embodiments, when the text classification model determines that the input text is a first classification category (e.g., a default classification category "like" or "wonderful"), the processor 130 may determine timestamp information of the video clip according to the event occurrence time or a program execution period of at least one of the game events. Then, the processor 130 may extract the video clip from the recorded game video according to the timestamp information. On the other hand, when the text classification model determines that the input text is a second classification category (e.g., a default classification category "dislike" or "unexciting"), the processor 130 may not extract the video clip according to the game events corresponding to the input text.

More specifically, when the text classification model determines that the input text is the first classification category, the processor 130 may determine a start timestamp and an end timestamp of the video clip according to the event occurrence time of one or more game events corresponding to the input text. For example, assuming that the event occurrence time of a first game event corresponding to the input text is "3 minutes and 01 seconds", the processor 130 may determine that the start timestamp of the video clip is "3 minutes and 01 seconds" and the end timestamp is "4 minutes and 10 seconds". Alternatively, assuming that the event occurrence time of the first game event corresponding to the input text is "4 minutes and 15 seconds", the processor 130 may determine that the start timestamp of the video clip is "4 minutes and 10 seconds" and the end timestamp is "4 minutes and 40 seconds". Then, the processor 130 may edit interesting video clips from the recorded game video according to the start timestamp and the end timestamp. For example, in FIG. 3, the processor 130 may extract video clips C1 and C2 from the recorded game video of the game application. Alternatively, in other embodiments, the processor 130 may directly set the program execution period corresponding to the input text as an extraction period of the video clip.

In some embodiments, the processor 130 may also determine description information of the video clip according to the classification category of the input text predicted by the text classification model. The description information may include keywords, game content identification information, game summary, or other game clip annotations. For example, when the text classification model determines that the input text belongs to the first classification category (e.g., a default classification category "first game summary"), the processor 130 may determine the description information of the extracted video clip according to the first classification category. When the text classification model determines that the input text is the second classification category (e.g., a default classification category "second game summary"), the processor 130 may determine the description information of the extracted video clip according to the second classification category. In other words, in different embodiments, by utilizing the text classification model, the processor 130 may predict the keywords, game summaries, or other game clip annotations of the game clips according to the event identifiers and time intervals in the input text.

It should be noted that in some embodiments, the text classification model needs to be established based on machine learning according to training data. The training data may include multiple training video clips, and the training video clips are annotated and correspond to classification labels. Embodiments are given below to illustrate.

Figure 6:
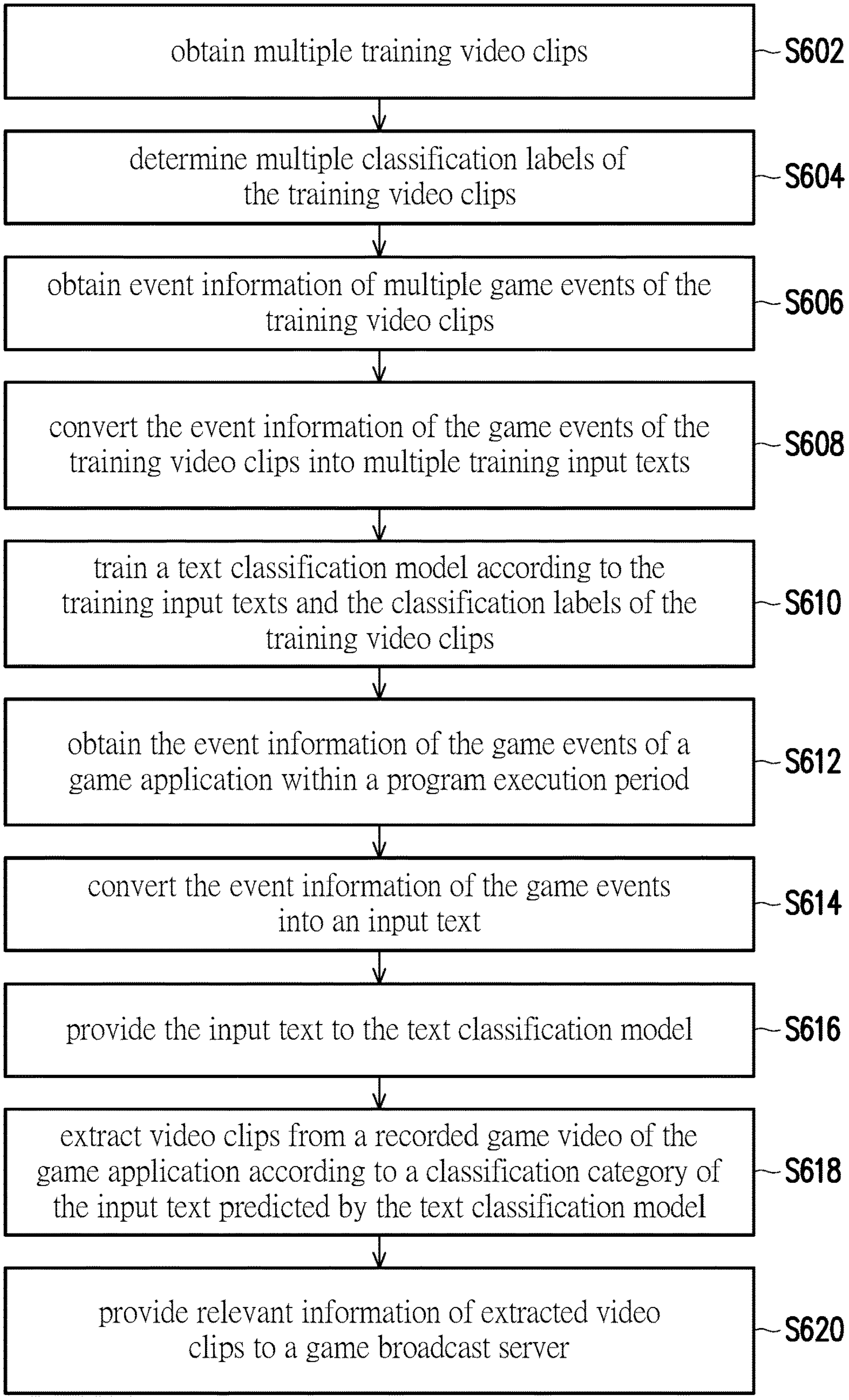
FIG. 6 is a flow chart of a video clip extraction method according to an embodiment of the disclosure.

FIG. 6 is a flow chart of a video clip extraction method according to an embodiment of the disclosure. Referring to FIG. 1 and FIG. 6, the method of this embodiment is adapted to the electronic device 100 in the above embodiment. Detailed steps of a thumbnail generation method for screen recorded video of this embodiment are described below with reference to various components in the electronic device 100.

In step S602, the processor 130 obtains multiple training video clips. For example, the processor 130 may obtain training video clips uploaded via the Internet by user terminal devices of multiple players.

In step S604, the processor 130 determines multiple classification labels of multiple training video clips. In some embodiments, the processor 130 may obtain multiple classification labels of the training video clips based on human annotations.

Alternatively, in some embodiments, the processor 130 may publish multiple training video clips on a web page to collect labeled content provided by multiple user terminals through the web page. For example, after watching the training video clips, viewers can click the label "like" or "dislike" on the web page. Afterwards, the processor 130 may receive labeled content provided by multiple user terminals through the web page to determine multiple classification labels for the multiple training video clips. More specifically, the processor 130 may count a number of votes for the label "like" of a certain training video clip. When the number of votes for the label "like" of a certain training video clip is greater than a critical value or greater than a number of votes for the label "dislike", the processor 130 may determine that the classification label of the training video clip is "like". On the contrary, when the number of votes for the label "like" of a certain training video clip is less than the critical value or less than the number of votes for the label "dislike", the processor 130 may determine that the classification label of the training video clip is "dislike".

In step S606, the processor 130 obtains event information of the game events of the training video clips. In step S608, the processor 130 converts the event information of the game events of the training video clips into multiple training input texts. A generation method of the training input text is similar to a generation method of the input text, which has been explained in the foregoing embodiments and will not be repeated in the following. It can be seen that the training input text may include event identifiers of multiple game events and at least one time interval. By concatenating the event identifiers of multiple game events of a certain training video clip and at least one time interval, the processor 130 may obtain the training input text corresponding to the training video clip.

In step S610, the processor 130 trains a text classification model according to the training input texts and the classification labels of the training video clips. More specifically, each of the training video clips corresponds to a training input text and a classification label. In a model training phase, the processor 130 may input the training input text to the text classification model in training, so that the text classification model in training outputs a model prediction result. A loss function may be used to measure the extent to which the model prediction result differs from the annotated classification labels. The processor 130 may use a calculated loss function value to adjust parameters of the text classification model to reduce the loss. This is achieved through backpropagation and an optimizer. The optimizer updates the weights and biases of the model according to the gradient of the loss function to minimize the loss function. After completing the training of the text classification model, the parameters of the text classification model may be recorded in the storage device 110.

In step S612, the processor 130 obtains the event information of the game events of the game application within a program execution period. In step S614, the processor 130 converts the event information of the game events into an input text. In step S616, the processor 130 provides the input text to the text classification model. In step S618, the processor 130 extracts video clips from a recorded game video of the game application according to the classification category of the input text predicted by the text classification model. The detailed implementation contents of steps S612 to S618 have been described in the previous embodiments and will not be repeated in the following.

Figure 7:
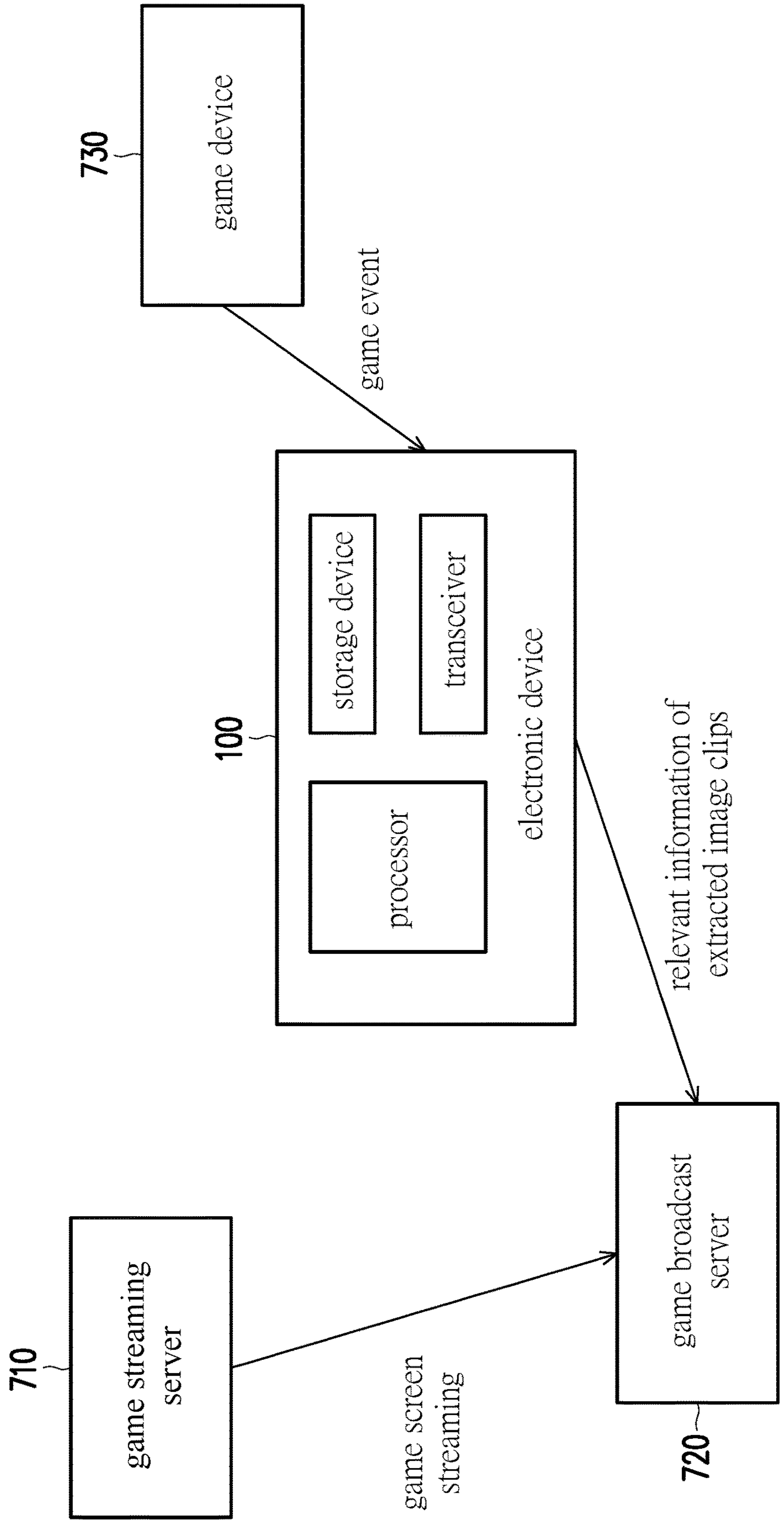
FIG. 7 is a schematic diagram of providing relevant information of video clips to a game broadcast platform according to an embodiment of the disclosure.

In step S620, the processor 130 provides relevant information of extracted video clips to a game broadcast server. For example, FIG. 7 is a schematic diagram of providing relevant information of video clips to a game broadcast platform according to an embodiment of the disclosure. Referring to FIG. 7, the electronic device 100 may obtain event information of the game events from a game device 730 of the player. The electronic device 100 may generate input text according to the event information of the game events, and use a classification category output by the text classification model to extract the video clips. The electronic device 100 may also obtain relevant information of the extracted video clips, and the relevant information may include timestamp information and classification category of the extracted video clips. The electronic device 100 may provide the relevant information of the extracted video clips to a game broadcast server 720.

It should be noted that during a game broadcast process, the game broadcast server 720 receives a game screen stream from a game streaming server 710. Generally speaking, there is a delay in the delivery of game screen streaming. In this case, before the important scenes of the game are transmitted to the game broadcast server 720, the game broadcast server 720 has already obtained the relevant information of the extracted image clips, so that the live broadcast personnel may know in advance the important content that may occur subsequently and prepare in advance.

To sum up, in the embodiment of the disclosure, after the event information of multiple game events is obtained, the event information may be converted into an input text. By inputting the input text into a trained text classification model, the text classification model outputs the classification category of the input text. Thus, according to a classification result of the input text, highlights or key video clips with specific content may be extracted from the recorded game video. As a result, key video clips that are interesting and have the key points of the game development may be automatically generated without the need for manual editing and recording of the game video or human intervention in judgment. In addition, even when the game is still in progress, relevant information of the key video clips may be obtained to make live game broadcasting smoother and more convenient.

It should be noted that, compared with using game screen and image recognition models to identify important moments in the game, the text classification model in this disclosure is less computationally intensive and may more efficiently identify important video clips in the game.

It will be apparent to those skilled in the art that various modifications and variations can 10 be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A video clip extraction method, comprising:

obtaining event information of a plurality of game events of a game application during a program execution period;

converting the event information of the game events into an input text, wherein an event sampling time window is utilized to retrieve the game events of an event sequence for conversion into the input text, and the game events comprise a first game event and a second game event;

providing the input text comprising a first event identification of the first game event, a second event identification of the second game event and a first time interval between the first game event and the second game event to a text classification model;

when the text classification model determines that the input text is a first classification category, determining timestamp information of a video clip according to an event occurrence time of one of the game events included in the event sequence corresponding to the input text; and extracting the video clip from the recorded game video according to the timestamp information, wherein the converting the event information of the game events into the input text comprises:

calculating at least one time interval between the game events according to a plurality of event occurrence times of the game events, wherein calculating the at least one time interval comprising calculating the first time interval between a first event occurrence time of the first game event and a second event occurrence time of the second game event; and generating the input text for the text classification model by concatenating the at least one time interval and event identifications of the game events.

2. The video clip extraction method according to claim 1, wherein generating the input text according to the at least one time interval and the event identifications of the each of the game events comprises:

arranging sequentially the event identifications and the at least one time interval of the game events according to occurrence order of the game events to generate the input text comprising the event identifications and the at least one time interval.

3. The video clip extraction method according to claim 1, wherein extracting the video clip from the recorded game video of the game application according to the classification category of the input text predicted by the text classification model comprises:

determining description information of the video clip according to the classification category of the input text predicted by the text classification model.

4. The video clip extraction method according to claim 1, further comprising:

obtaining a plurality of training video clips;

determining a plurality of classification labels of the training video clips;

obtaining event information of a plurality of game events of the training video clips;

converting the event information of the game events of the training video clips into a plurality of training input texts; and training the text classification model according to the training input texts and the classification labels of the training video clips.

5. The video clip extraction method according to claim 4, wherein determining the classification labels of the training video clips comprises:

publishing the training video clips on a web page; and determining the classification labels of the training video clips by receiving, through the web page, labeled content provided by a plurality of user terminals.

6. The video clip extraction method according to claim 1, further comprising:

providing relevant information of extracted video clips to a game broadcast server.

7. An electronic device, comprising:

a storage device, recording a plurality of modules;

a processor, coupled to the storage device, executing the module and configured to:

obtain event information of a plurality of game events of a game application during a program execution period;

convert the event information of the game events into an input text, wherein an event sampling time window is utilized to retrieve the game events of an event sequence for conversion into the input text, and the game events comprise a first game event and a second game event;

provide the input text comprising a first event identification of the first game event, a second event identification of the second game event and a first time interval between the first game event and the second game event to a text classification model;

when the text classification model determines that the input text is a first classification category, determine timestamp information of a video clip according to an event occurrence time of one of the game events included in the event sequence corresponding to the input text; and extract the video clip from the recorded game video according to the timestamp information, wherein the processor is further configured to:

calculate at least one time interval between the game events according to a plurality of event occurrence times of the game events, wherein the processor is configured to calculate the first time interval between a first event occurrence time of the first game event and a second event occurrence time of the second game event; and generate the input text for the text classification model by concatenating the at least one time interval and event identifications of each of the game events.

8. The electronic device according to claim 7, wherein the processor is configured to:

arrange sequentially the event identifications and the at least one time interval of the game events according to occurrence order of the game events to generate the input text comprising the event identifications and the at least one time interval.

9. The electronic device according to claim 7, wherein the processor is configured to:

determine description information of the video clip according to the classification category of the input text predicted by the text classification model.

10. The electronic device according to claim 7, wherein the processor is configured to:

obtain a plurality of training video clips;

determine a plurality of classification labels of the training video clips;

obtain event information of a plurality of game events of the training video clips;

convert the event information of the game events of the training video clips into a plurality of training input texts; and train the text classification model according to the training input texts and the classification labels of the training video clips.

11. The electronic device according to claim 10, wherein the processor is configured to:

publish the training video clips on a web page; and determine the classification labels of the training video clips by receiving, through the web page, labeled content provided by a plurality of user terminals.

12. The electronic device according to claim 7, wherein the processor is configured to:

provide relevant information of extracted video clips to a game broadcast platform.

* * * * *